United States Patent
Glicksman et al.

[11] Patent Number: 5,861,136
[45] Date of Patent: Jan. 19, 1999

[54] METHOD FOR MAKING COPPER I OXIDE POWDERS BY AEROSOL DECOMPOSITION

[75] Inventors: Howard David Glicksman, Wilmington, Del.; Toivo Tarmo Kodas; Diptarka Majumdar, both of Albuquerque, N. Mex.

[73] Assignee: E. I. du Pont de Nemours and Company, Wilmington, Del.

[21] Appl. No.: 837,587

[22] Filed: Apr. 21, 1997

Related U.S. Application Data

[63] Continuation-in-part of Ser. No. 669,804, Jun. 27, 1996, abandoned, which is a continuation of Ser. No. 370,749, Jan. 10, 1995, abandoned.

[51] Int. Cl.⁶ .................................................. C01G 3/02
[52] U.S. Cl. ........................................................ 423/604
[58] Field of Search .................................. 423/604, 395, 423/23

[56] References Cited

U.S. PATENT DOCUMENTS

| | | | |
|---|---|---|---|
| 2,155,119 | 4/1939 | Ebner | 423/604 |
| 2,304,078 | 12/1942 | Drapeau et al. | 423/604 |
| 2,737,445 | 3/1956 | Nossen | 423/604 |
| 3,373,013 | 3/1968 | Hardy et al. | 423/604 |
| 3,607,023 | 9/1971 | Palm | 23/147 |
| 4,065,300 | 12/1977 | Poarch | 423/604 |
| 4,080,430 | 3/1978 | Shah et al. | 423/604 |
| 5,421,854 | 6/1995 | Kodas et al. | 75/355 |
| 5,429,657 | 7/1995 | Glicksman et al. | 75/351 |
| 5,439,502 | 8/1995 | Kodas et al. | 75/365 |

FOREIGN PATENT DOCUMENTS

| | | |
|---|---|---|
| A-369117 | 5/1990 | European Pat. Off. . |
| A-4111231 | 10/1992 | Germany . |

OTHER PUBLICATIONS

Jacobson, "Encyclopedia of Chemical Reaction", vol. III, QD 73 J 3 C.3, 1949, pp. 310, 350, 360,407 (No Month).

Majumdar et al, "Copper (I) Oxide Powder Generation by Spray Hydrolysis", J. Mater. Res., vol. 11, No. 11, pp. 2861–2868, Nov. 1996.

Primary Examiner—Ngoc-Yen Nguyen

[57] ABSTRACT

The invention is directed to a method for the manufacture of fully dense, finely divided, spherical particles of copper I oxide with controlled particle size distribution. The invention is further directed to a method for the manufacture of finely divided, spherical particles of copper I oxide with controlled particle size distribution.

9 Claims, 6 Drawing Sheets

METHOD FOR MAKING COPPER I OXIDE POWDERS BY AEROSOL DECOMPOSITION

CROSS REFERENCE TO RELATED APPLICATIONS

This application is a continuation-in-part of application Ser. No. 08/669,804 filed Jun. 27, 1996 which is now abandoned and which is a continuation of application Ser. No. 08/370,749 filed Jan. 10, 1995, which is now abandoned.

FIELD OF THE INVENTION

The invention is directed to an improved process for making copper I oxide ($Cu_2O$) powders. In particular, the invention is directed to a process for making such powders that are fully dense, single phase, with high purity, spherical morphology and controlled particle size distribution.

BACKGROUND OF THE INVENTION

In thick film conductor systems, copper I oxide is used to promote adhesion to substrates. Copper I oxide powder is added to form chemical or reactive bonds with the substrate, thereby enhancing the adhesion of the conductor.

Known methods of manufacture of copper I oxide involve the furnace reduction of mixtures of copper oxides and copper, the electrolytic process involving plating copper I oxide from an alkaline sodium solution using copper electrodes, or reducing alkaline solutions of copper II salts. These inherently do not produce phase pure copper I oxide. Some copper II oxide is present. This copper II oxide impurity dilutes the efficacy of the copper I oxide and can degrade the solderability of thick film conductors. In addition, these processes are not easily controlled and, therefore, are not found to produce materials with uniform particle size, spherical shape and fully dense, all of which are very important in the improvement in the properties of thick film pastes.

With increasing circuit complexity and decreasing feature sizes, thick film pastes must be composed of pure and chemically uniform particles with very well controlled particle size distributions. Spray pyrolysis has emerged as a promising technique for the production of pure, fully dense, spherical powders with compositional homogeneity at the molecular level with a uniform particle size. Also, the invention may be produced at a lower temperature which produces pure, spherical powders with uniform particle size.

SUMMARY OF THE INVENTION

Figure 1:
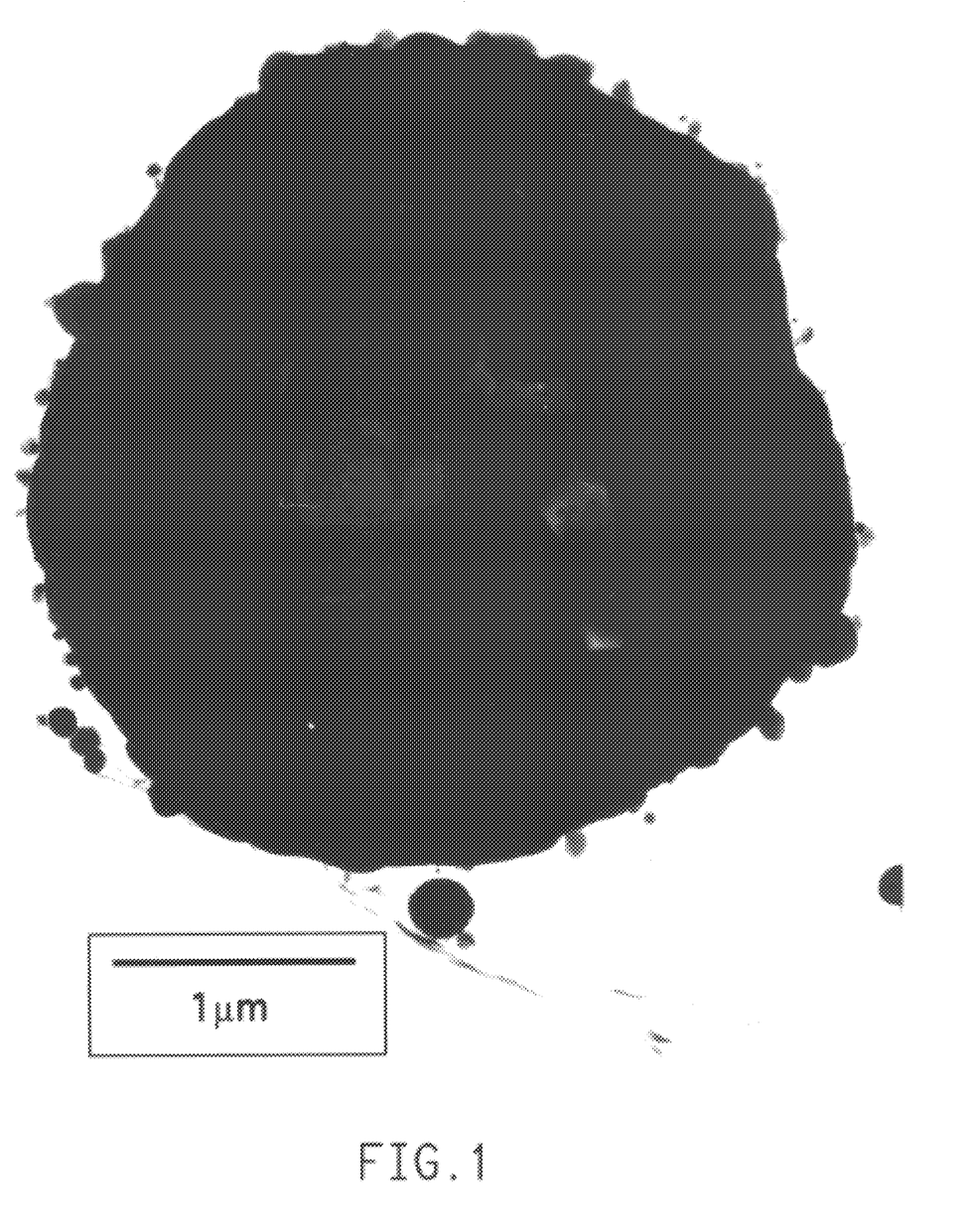
FIG. 1 is a TEM photograph at magnification of 40,000× of copper I oxide that depicts a not fully dense particle.
Figure 2:
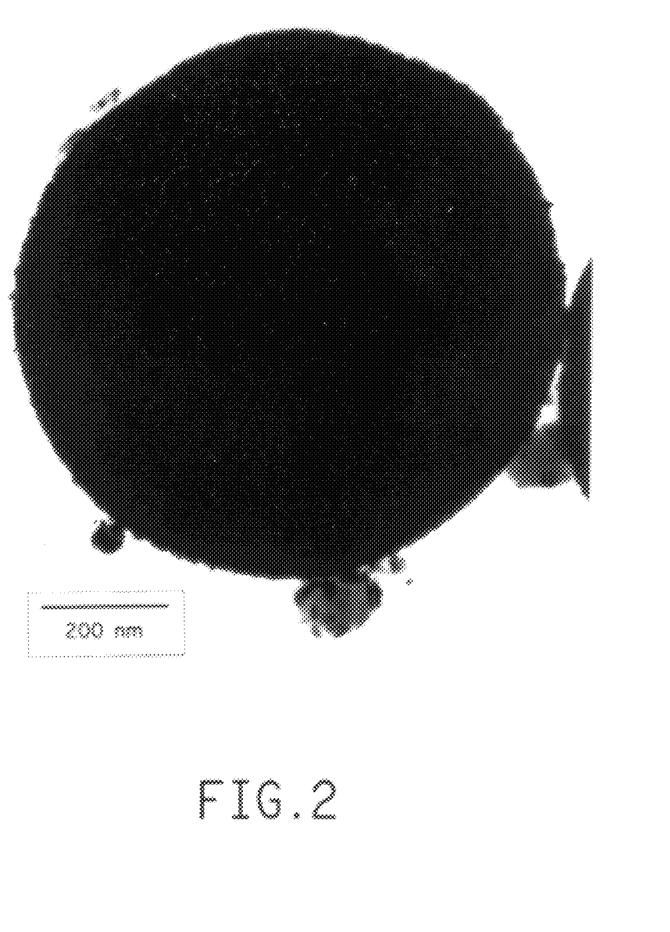
FIG. 2 is a TEM photograph at magnification of 100,000× of copper I oxide that depicts a fully dense particle.
Figure 3:
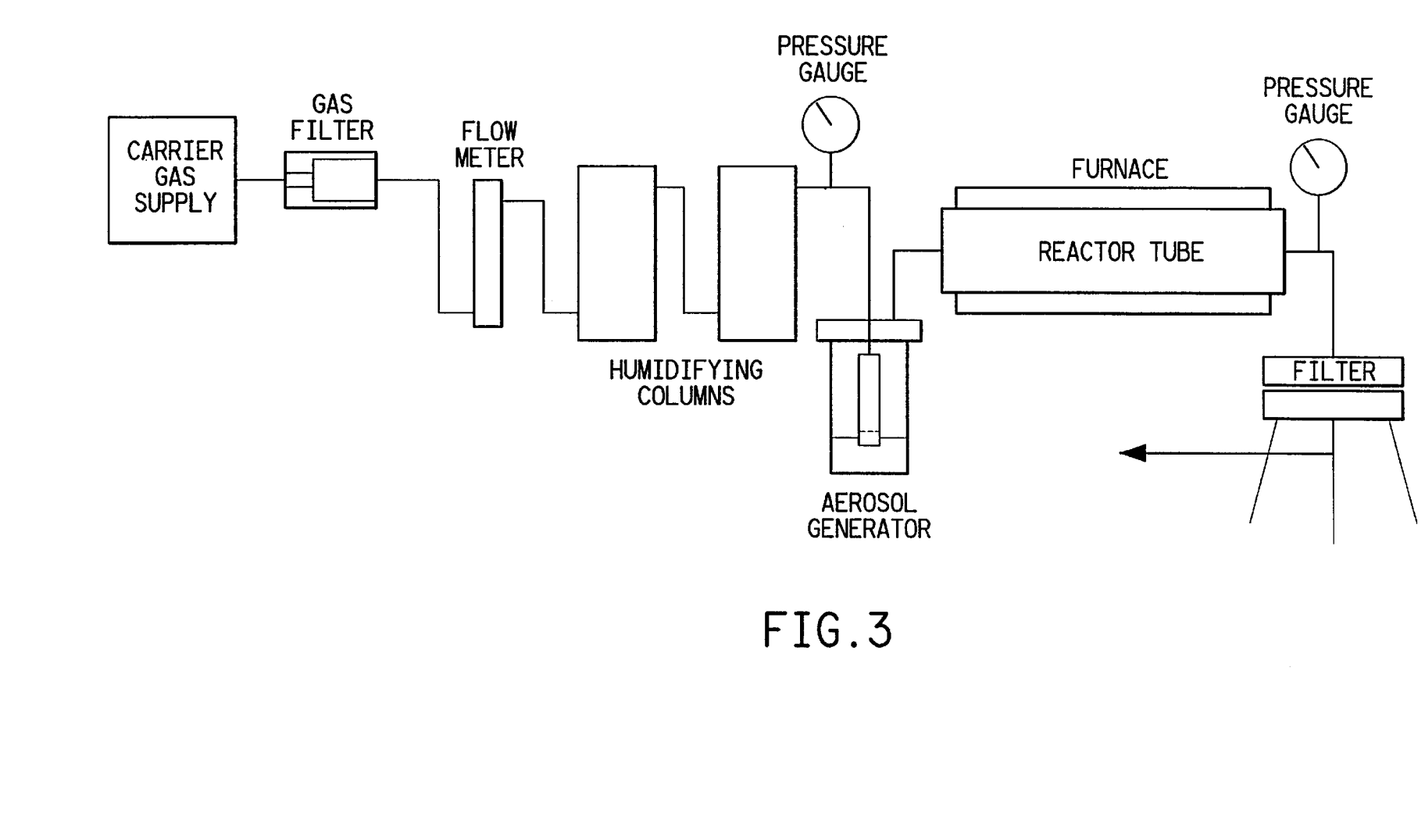
FIG. 3 is an experimental apparatus used for spray pyrolysis.
Figure 4:
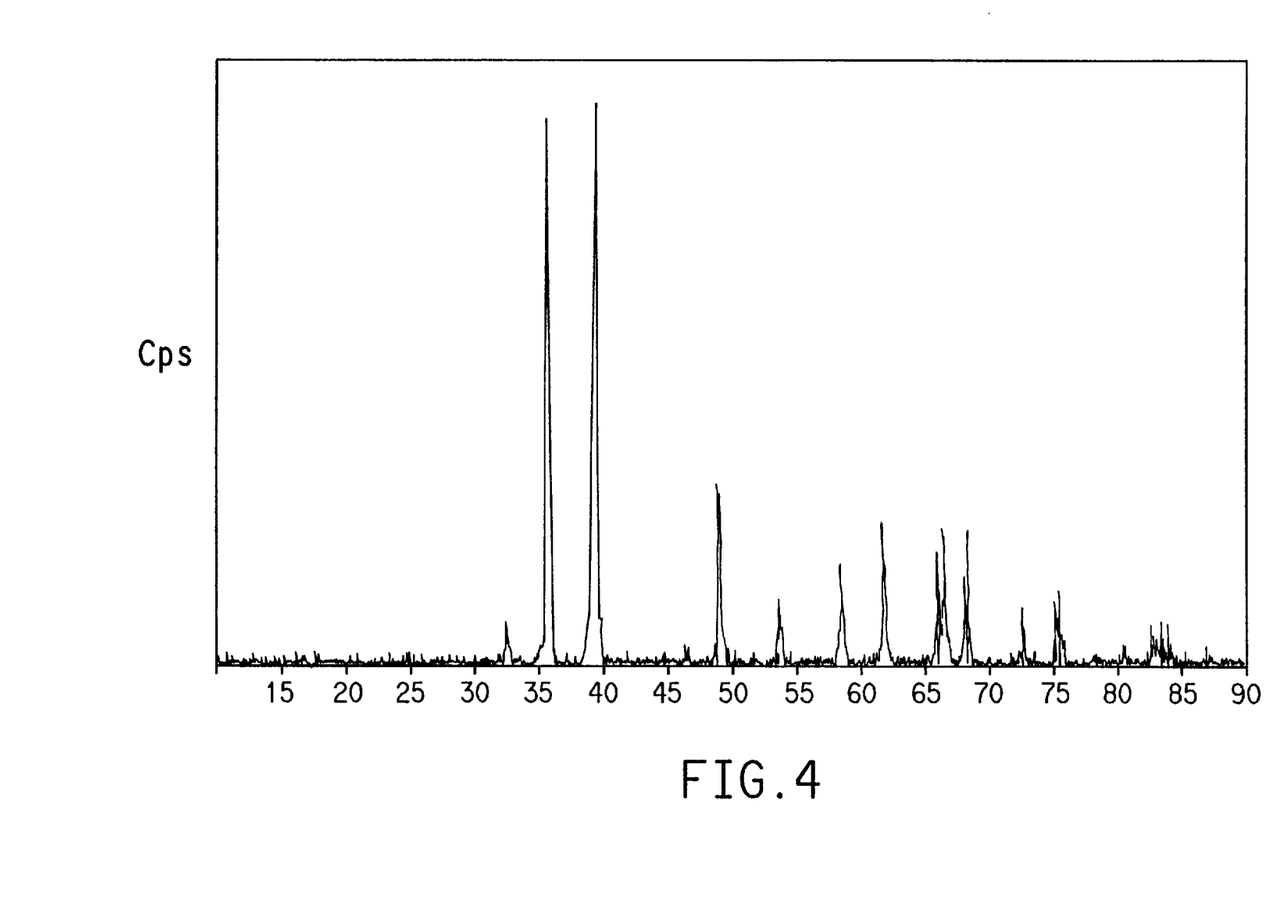
FIG. 4 is an X-ray diffraction of Example 3 from Table 1 showing copper II oxide.
Figure 5:
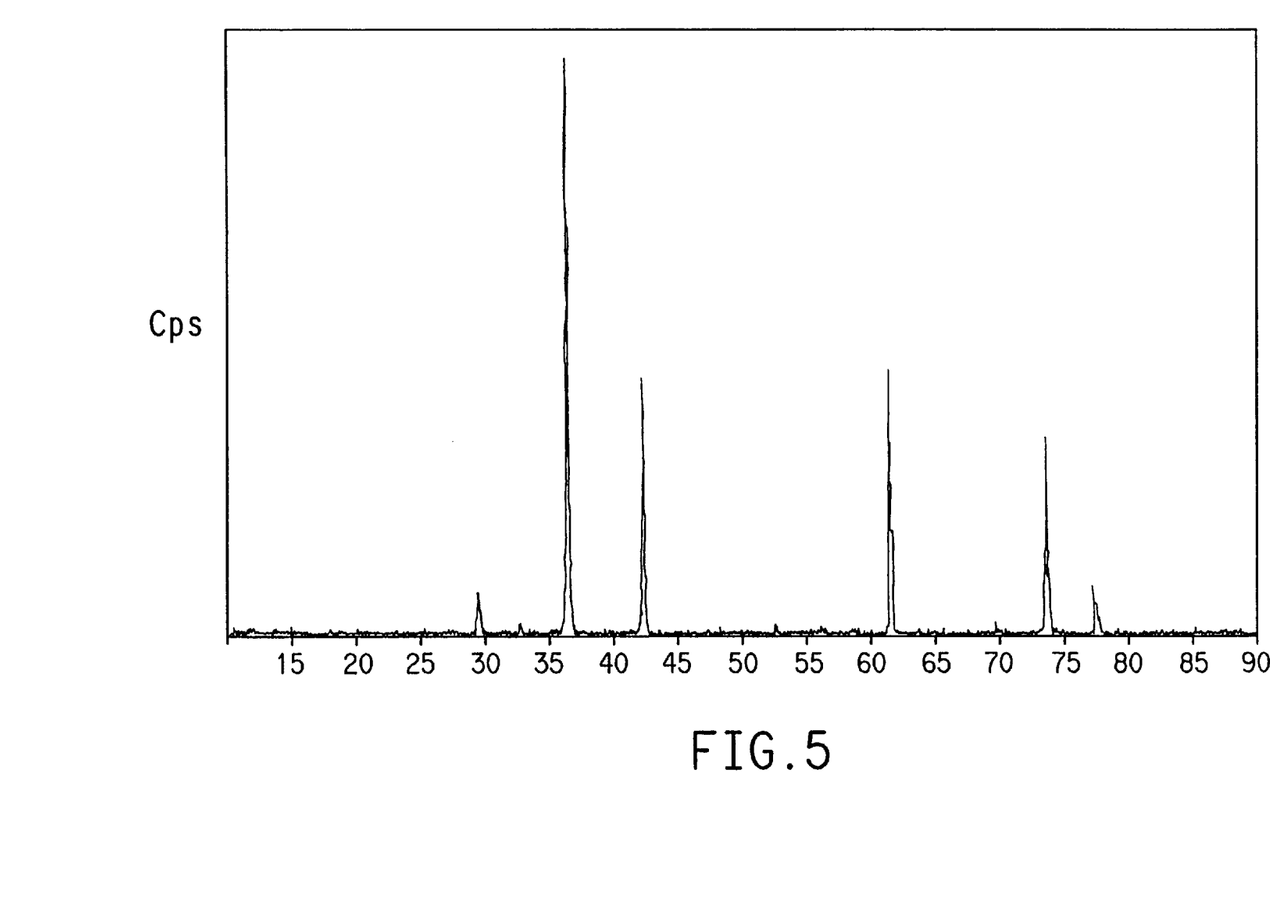
FIG. 5 is an X-ray diffraction of Example 6 from Table 1 showing copper I oxide.
Figure 6:
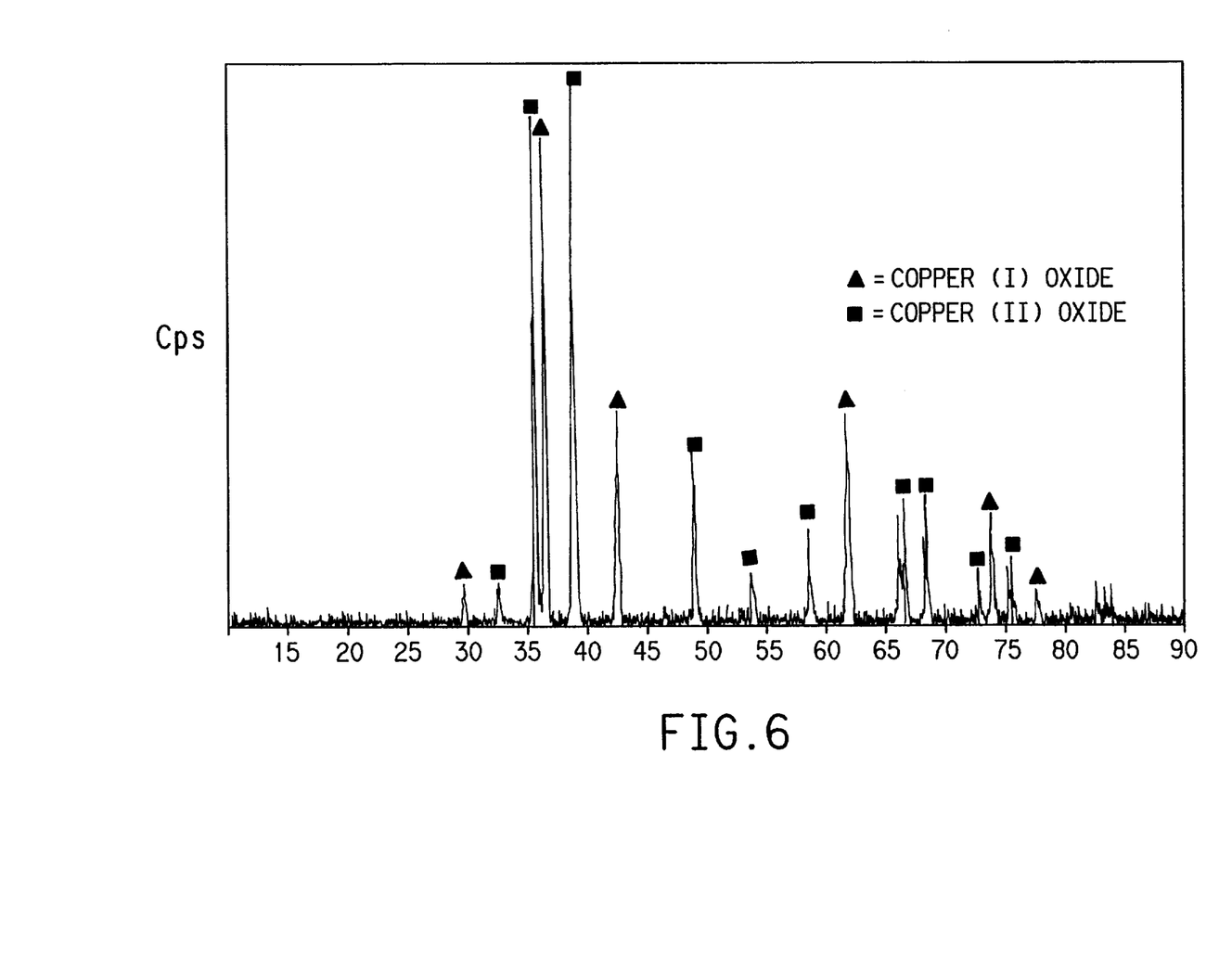
FIG. 6 is an X-ray diffraction of Example 5 from Table 1 showing a mixture of copper I oxide and copper II oxide.

The invention is directed to a method for the manufacture of fully dense, finely divided, spherical particles of copper I oxide ($Cu_2O$) comprising the sequential steps:

A. forming an unsaturated solution of a thermally decomposable copper containing compound in a thermally volatilizable solvent wherein the copper containing compound is used in concentrations not below 0.002 mole/liter or not higher than 90% of saturation and wherein particle size of copper I oxide is an approximate function of the cube root of the concentration of the unsaturated solution;

B. forming an aerosol consisting essentially of finely divided droplets of the solution from step A dispersed in an inert carrier gas, the droplet concentration being below the concentration where collisions and subsequent coalescence of the droplets results in a 10% reduction in droplet concentration and wherein the particle size distribution of copper I oxide is a direct function of the droplet size distribution;

C. heating the aerosol, (1) to an operating temperature of at least 1000° C. but below the decomposition temperature of copper I oxide, (2) at a rate such that the droplets do not explosively burst, and (3) with sufficient residence time; wherein (a) the solvent is volatilized, (b) the copper containing compound is decomposed to form the copper II oxide (CuO), (c) the copper II oxide is decomposed to form pure phase copper I oxide ($Cu_2O$), and (d) the copper I oxide is fully densified; and D. separating the fully dense, spherical particles of copper I oxide from the carrier gas, reaction by-products and solvent volatilization products. The invention is further directed to a method for the manufacture of finely divided, spherical particles of copper I oxide ($Cu_2O$) with controlled particle size distribution wherein the method is as described hereinabove with the exception of the operating temperature found in step C being at least 800° C. but below 1000° C.

DETAILED DESCRIPTION OF THE INVENTION

Copper Containing Compound

Any soluble copper salt can be used in the method of the invention so long as it is inert with respect to the carrier gas used to form the aerosol. Examples of suitable salts are cupric nitrate, cupric sulfate, cupric formate, and cupric acetate. Insoluble copper salts are not suitable. The copper containing compound may be used in concentrations as low as 0.002 mole/liter and upward to just below the solubility limit of the particular salt such that the salt does not precipitate while in solution. It is preferred not to use concentrations below 0.002 mole/liter or higher than 90% of saturation.

While it is preferred to use water-soluble copper salts as the source of copper for the method of the invention, the method can, nevertheless, be carried out effectively with the use of other solvent soluble compounds such as organometallic copper compounds dissolved in either aqueous or organic solvents.

Operating Variables

The method of the invention can be carried out under a wide variety of operating conditions so long as the following fundamental criteria are met:

1. The concentration of the copper containing compound should be at least 10% below the saturation concentration in order to prevent precipitation of solids before removal of the liquid solvent;

2. The concentration of the droplets in the aerosol must be sufficiently low so that it is below the concentration where collisions and subsequent coalescence of the droplets results in a 10% reduction in droplet concentration causing significant broadening of size distribution.

Though it is essential to operate under the saturation point of the copper containing compound, the concentration is not otherwise critical in the operation of the process. Much lower concentrations of the copper containing compound can be used. However, it will ordinarily be preferred to use higher concentrations to maximize the mass of particles that can be made per unit of time. The concentration will determine the resulting size of the copper oxide particle. The higher the concentration of copper containing compounds in the droplet, the more mass in the droplet and the subsequent increase in the size of the particle. In addition, particle size is an approximate function of the cube root of the concentration. If a greater change in particle size is needed, a different aerosol generator must be used.

Any conventional apparatus for droplet generation may be used such as nebulizers, collision nebulizers, ultrasonic nebulizers, vibrating orifice aerosol generators, centrifugal atomizers, two-fluid atomizers, electrospray atomizers and the like. The particle size distribution of the powder is a direct function of the distribution of the droplet sizes generated. Therefore, the overall particle size distribution is dependent on the generator chosen for the process.

Virtually any carrier gas which is inert with respect to the solvent for the copper containing compound and with respect to the compounds themselves and the copper I oxide powder may be used. Examples of suitable carrier gases are nitrogen, argon, helium, and the like.

The temperature range over which the method of the invention can be carried out is quite wide and ranges from the decomposition temperature of copper II oxide (about 800° C. in $N_2$) to the decomposition temperature of the copper I oxide (approximately 1400° C.) although below 1235° C. is the preferred operating temperature. This invention allows for the production of spherical, phase pure, copper I oxide at a temperature of 800° C. which is significantly below the melting point of copper I oxide. In addition, by operating at temperatures above 1000° C., fully dense, spherical, phase pure copper I oxide powder can be produced. Fully dense herein means devoid of hollow spaces.

The type of apparatus used to heat the aerosol is not by itself critical providing the apparatus does not cause bursting of the droplets. An example of such apparatus is a tube furnace.

The evolution of particle morphology depends to a large extent on the rate at which solvent evaporation occurs from a droplet. The aerosol droplets from which the product particles evolve do not burst or rupture during any part of the process. The possibility of the bursting of droplets is precluded by sending the aerosol droplets through an initial zone in a furnace whereby the temperature of a droplet gradually rises to the final temperature. This zone provides an environment for controlled evaporation of the solvent in the droplets and thereby prevents them from rupturing due to explosive release of solvent vapor. The resultant powder particle size and particle size distribution is dependent not only on solution concentration and droplet size distribution but also on gradual rise in temperature during the heating step.

Upon reaching the reaction temperature and maintaining the temperature for a residence time which causes the full densification of the particles, the particles are separated from the carrier gas, reaction by-products and solvent volatilization products and the powder is collected by one or more devices such as filters, cyclones, electrostatic separators, bag filters, filter discs, and the like. The by-products generated upon completion of the reaction consists of the carrier gas, decomposition products of the copper containing compound, and solvent vapor. Thus, in the case of preparing copper I oxide from aqueous copper nitrate using $N_2$ as the carrier gas, the by-products generated from the method of the invention will consist of nitrogen oxide(s), water, and $N_2$ gas.

Test Apparatus

The experimental apparatus used in the Examples is shown in FIG. 3. A source of carrier gas supplies the $N_2$ through the regulator and gas flow meter. The carrier gas flow rate determined the residence time of the aerosol in the reactor. The aerosol was produced using a modified BGI Collison CN - 25 generator and the reactor was a Lindberg 3-zone furnace with a 91 cm. heated region. A 152 cm. Coors mullite reactor tube (9 cm. O.D., 8 cm. I.D.) was used. The powders were collected on a membrane filter supported by a heated stainless steel filter holder. The filter was a Tuffryn membrane filter (142 mm dia., 0.45 micron pore dia.) supported on a Gelman 147 mm dia. filter holder.

Copper Nitrate Solution

In the Examples which follow, the copper nitrate solution used for the production of the copper oxide powder samples was prepared by the following procedure:

1. Add 79.55 g of 99.99% pure copper II oxide to a beaker.
2. Slowly add 180 g of nitric acid (70% by weight) to the copper II oxide powder.
3. Gently heat and stir the mixture for several hours until all the powder has dissolved to produce a blue solution.
4. Slowly add additional copper II oxide powder until some of the powder remains undissolved.
5. Filter the solution to remove undissolved powder.
6. Dilute the solution to desired molarity.

Sixteen process runs (Examples 1–16) were performed in which the method of the invention was demonstrated. The operating conditions of these runs are shown in Table 1 and 2 along with the selected properties of the copper oxide particles produced thereon.

EXAMPLES

Examples 1–4 indicate that copper II oxide is produced at temperatures at or below 700° C. in nitrogen. These particles are not fully densified. As the temperature is increased, the particles become more crystalline as indicated by the narrowing of the x-ray diffraction peaks. Transmission electron microscopy (TEM) indicate that the particles are not fully dense and contain some hollow and void spaces as depicted in FIG. 1.

Examples 5 and 6 indicate that at 800° C. in nitrogen, pure phase copper I oxide can be produced if the residence time is long enough. Example 5 was made with a residence time of 3.0 sec. and was found to contain a mixture of Cu I oxide and Cu II oxide as shown by x-ray diffraction. Increasing the residence time to 5.1 sec. (example 6) produced phase pure Cu I oxide. Example 6 powder was found to not be fully dense as indicated by void spaces.

Examples 7–9 indicate that at temperatures of 1000° C. or higher, fully dense, phase pure, spherical copper I oxide powder is produced. Below 1000° C., some of the particles (not all) are not filly dense and still have some void spaces in them as shown by FIG. 1.

Examples 10–11 indicate that using the inert gas argon as the carrier gas produces similar results to that reported using nitrogen gas.

Examples 12–14 were made using air as the carrier gas which is not inert to this system. These examples show that at temperatures between 800° C. and 1200° C., the resulting product is copper II oxide. At 1200° C., a mixture of copper I oxide and copper II oxide was obtained as shown by x-ray diffraction. The oxygen in the air keeps the copper oxide oxidized to the +2 state until the high temperature of 1200° C. where the copper II oxide decomposes partially to Cu I oxide.

Examples 15 and 16 indicate that the particle size distribution is not dependent on the temperature or the flow rate. Examples 15 and 16 had the same concentration and were made using the same aerosol generator resulting in both examples having the same narrow particle size distribution with an average size of about 1 micron. Particle size distribution was measured using a Leeds and Northrup Microtrac II® 7998 SBA.

TABLE 1

| Example | Copper nitrate mole/l | Temperature °C. | Carrier gas | Flow rate 1 pm | Residence time sec. | X-ray diffraction | Density TEM |
|---|---|---|---|---|---|---|---|
| 1 | 1.0 | 400 | $N_2$ | 7.79 | 7.0 | CuO | not dense |
| 2 | 1.0 | 500 | $N_2$ | 7.79 | 6.0 | CuO | not dense |
| 3 | 1.0 | 600 | $N_2$ | 6.04 | 6.9 | CuO | not dense |
| 4 | 1.0 | 700 | $N_2$ | 6.04 | 6.2 | CuO | not dense |
| 5 | 1.0 | 800 | $N_2$ | 11.36 | 3.0 | $Cu_2O$, CuO | mixture |
| 6 | 1.0 | 800 | $N_2$ | 6.62 | 5.1 | $Cu_2O$ | not dense |
| 7 | 1.0 | 900 | $N_2$ | 5.45 | 5.8 | $Cu_2O$ | not dense |
| 8 | 1.0 | 1000 | $N_2$ | 9.55 | 3.0 | $Cu_2O$ | dense |
| 9 | 0.5 | 1200 | $N_2$ | 9.55 | 2.6 | $Cu_2O$ | dense |
| 10 | 1.0 | 800 | Ar | 7.79 | 5.2 | $Cu_2O$ | not dense |
| 11 | 1.0 | 1200 | Ar | 9.55 | 3.0 | $Cu_2O$ | dense |
| 12 | 1.0 | 800 | air | 7.79 | 5.2 | CuO | not dense |
| 13 | 1.0 | 1000 | air | 9.55 | 3.6 | CuO | not dense |
| 14 | 1.0 | 1200 | air | 7.79 | 3.8 | $Cu_2O$, CuO | mixture |

TABLE 2

| Example | Copper Nitrate mole/l | Temp. °C. | Carrier gas | Flow Rate 1 pm | Residence Time sec. | $d_{10}$ microns | $d_{50}$ microns | $d_{90}$ microns |
|---|---|---|---|---|---|---|---|---|
| 15 | 0.5 | 900 | $N_2$ | 7.2 | 9.4 | 0.52 | 1.12 | 2.64 |
| 16 | 0.5 | 1150 | $N_2$ | 6 | 9.4 | 0.44 | 1.05 | 2.62 |

We claim:

1. A method for the manufacture of phase pure, fully dense, finely divided, spherical particles of copper I oxide ($Cu_2O$) comprising the sequential steps:
   A. forming an unsaturated solution of a thermally decomposable copper containing compound in a thermally volatilizable solvent wherein the copper containing compound is used in concentrations not below 0.002 mole/liter or not higher than 90% of saturation and wherein particle size of copper I oxide is an approximate function of the cube root of the concentration of the unsaturated solution;
   B. forming an aerosol consisting essentially of finely divided droplets of the solution from step A dispersed in an inert carrier gas, the droplet concentration being below the concentration where collisions and subsequent coalescence of the droplets results in a 10% reduction in droplet concentration;
   C. heating the aerosol (1) to an operating temperature of at least 1000° C. but below the decomposition temperature of copper I oxide, (2) at a rate such that the droplets do not explosively burst, and (3) with sufficient residence time; wherein (a) the solvent is volatilized, (b) the copper containing compound is decomposed to form the copper II oxide (CuO), (c) the copper II oxide is decomposed to form pure phase copper I oxide ($Cu_2O$), and (d) the copper I oxide is fully densified; and
   D. separating the fully dense, spherical particles of copper I oxide from the carrier gas, reaction by-products and solvent volatilization products.

2. The method of claim 1 in which the thermally decomposable copper containing compound is copper nitrate.

3. The method of claim 1 in which the carrier gas is nitrogen.

4. The method of claim 1 in which the operating temperature is 1000°–1235° C.

5. The method of claim 1 in which the thermally volatilizable solvent is deionized water.

6. A method for the manufacture of phase pure, finely divided, spherical particles of copper I oxide ($Cu_2O$) comprising the sequential steps:
   A. forming an unsaturated solution of a thermally decomposable copper containing compound in a thermally volatilizable solvent wherein the copper containing compound is used in concentrations not below 0.002 mole/liter or not higher than 90% of saturation and wherein particle size of copper I oxide is an approximate function of the cube root of the concentration of the unsaturated solution;
   B. forming an aerosol consisting essentially of finely divided droplets of the solution from step A dispersed in an inert carrier gas, the droplet concentration being below the concentration where collisions and subsequent coalescence of the droplets results in a 10% reduction in droplet concentration;
   C. heating the aerosol (1) to an operating temperature of at least 800° C. but below 1000° C., and (2) at a rate such that the droplets do not explosively burst wherein (a) the solvent is volatilized, (b) the copper containing compound is decomposed to form the copper II oxide (CuO), (c) the copper II oxide is decomposed to form pure phase copper I oxide ($Cu_2O$); and D. separating the spherical particles of copper I oxide from the carrier gas, reaction by-products and solvent volatilization products.

7. The method of claim 1 in which the thermally decomposable containing compound is copper nitrate.

8. The method of claim 1 in which the carrier gas is nitrogen.

9. The method of claim 1 in which the thermally volatilizable solvent is deionized water.

\* \* \* \* \*